United States Patent
Gu

(10) Patent No.: US 6,367,408 B1
(45) Date of Patent: Apr. 9, 2002

(54) EN ROUTE RAGE SENSING APPARATUS

(75) Inventor: Jing Lu Gu, 1806 Yosemite Dr., Milpitas, CA (US) 95035

(73) Assignee: Jing Lu Gu, Milpitas, CA (US)

( * ) Notice: Subject to any disclaimer, the term of this patent is extended or adjusted under 35 U.S.C. 154(b) by 0 days.

(21) Appl. No.: 09/561,201

(22) Filed: Apr. 27, 2000

(51) Int. Cl.[7] .................................................. G08B 5/00
(52) U.S. Cl. ......................... 116/203; 116/215; 33/365
(58) Field of Search .............................. 116/1, 2, 200, 116/201, 203, 215, 264, 276, 206; 33/365, 367, 370, 371, 534

(56) References Cited

U.S. PATENT DOCUMENTS

| | | | | |
|---|---|---|---|---|
| 2,768,602 A | * | 10/1956 | Eichholz et al. | 116/215 |
| 3,207,122 A | * | 9/1965 | Salembier | 116/215 |
| 3,301,559 A | * | 1/1967 | Jolley | 116/200 |
| 3,467,053 A | * | 9/1969 | Davis et al. | 116/215 |
| 3,515,091 A | * | 6/1970 | Smith | 116/203 |
| 3,688,734 A | * | 9/1972 | Davis et al. | 116/200 |
| 4,135,472 A | * | 1/1979 | Chesla et al. | 116/203 |
| 4,340,008 A | * | 7/1982 | Mendelson | 116/215 |

* cited by examiner

Primary Examiner—Andrew H. Hirshfeld
(74) Attorney, Agent, or Firm—Peninsula Law Group; Daniel Hopen

(57) ABSTRACT

An en route package apparatus and methods for operating the same comprise a reservoir having a fluid, a tilt indicator section having an X direction indicator including an X capillary coupled to the fluid in the reservoir, a Y direction indicator including a Y capillary coupled to the fluid in the reservoir, and a Z direction indicator including a Z capillary coupled to the fluid in the reservoir wherein the fluid from the reservoir flows through one of the X capillary, Y capillary, or Z capillary to a respective corresponding direction indicator in response to tilting the en route package sensing apparatus in a direction corresponding to the particular direction indicator.

19 Claims, 4 Drawing Sheets

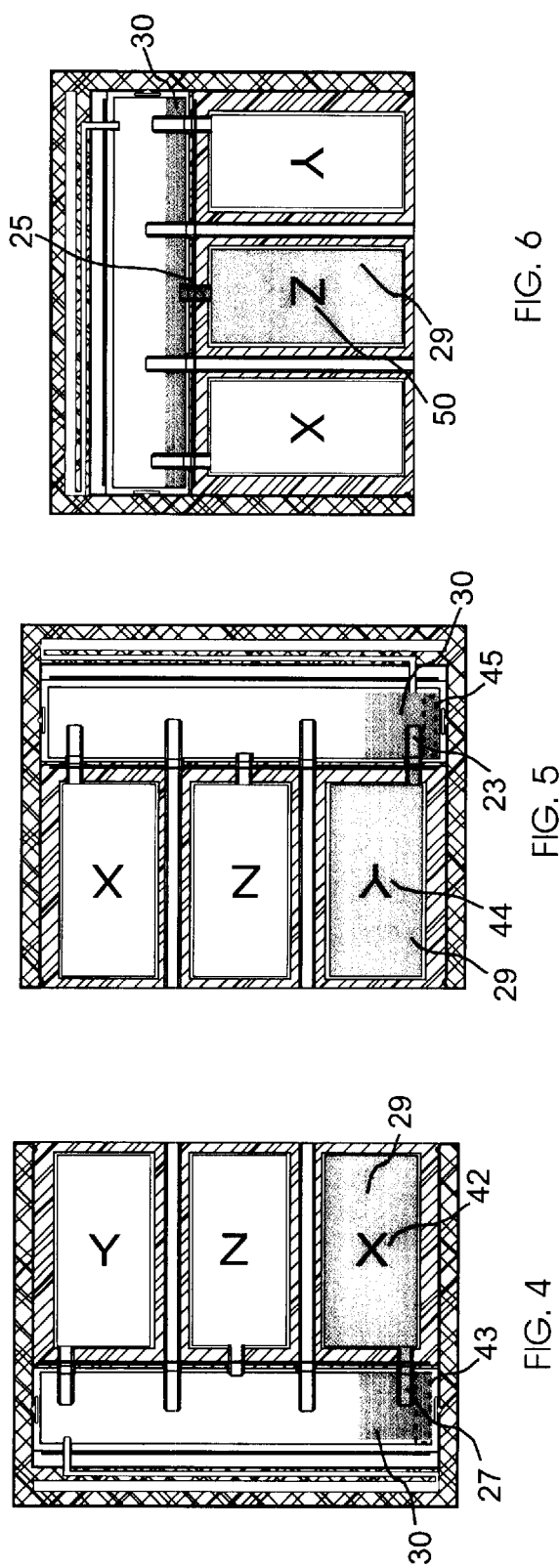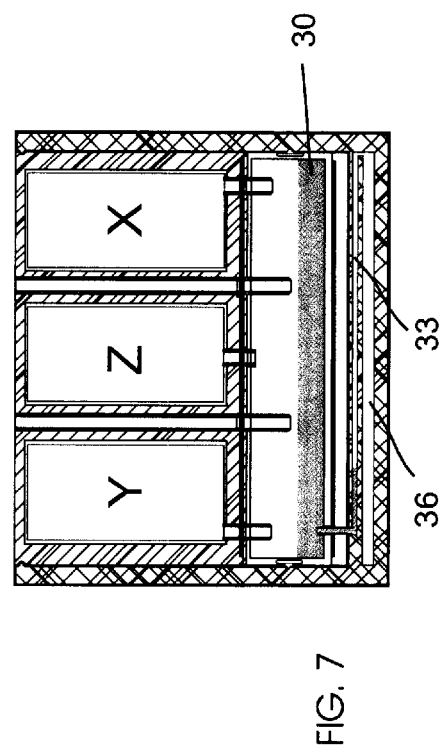

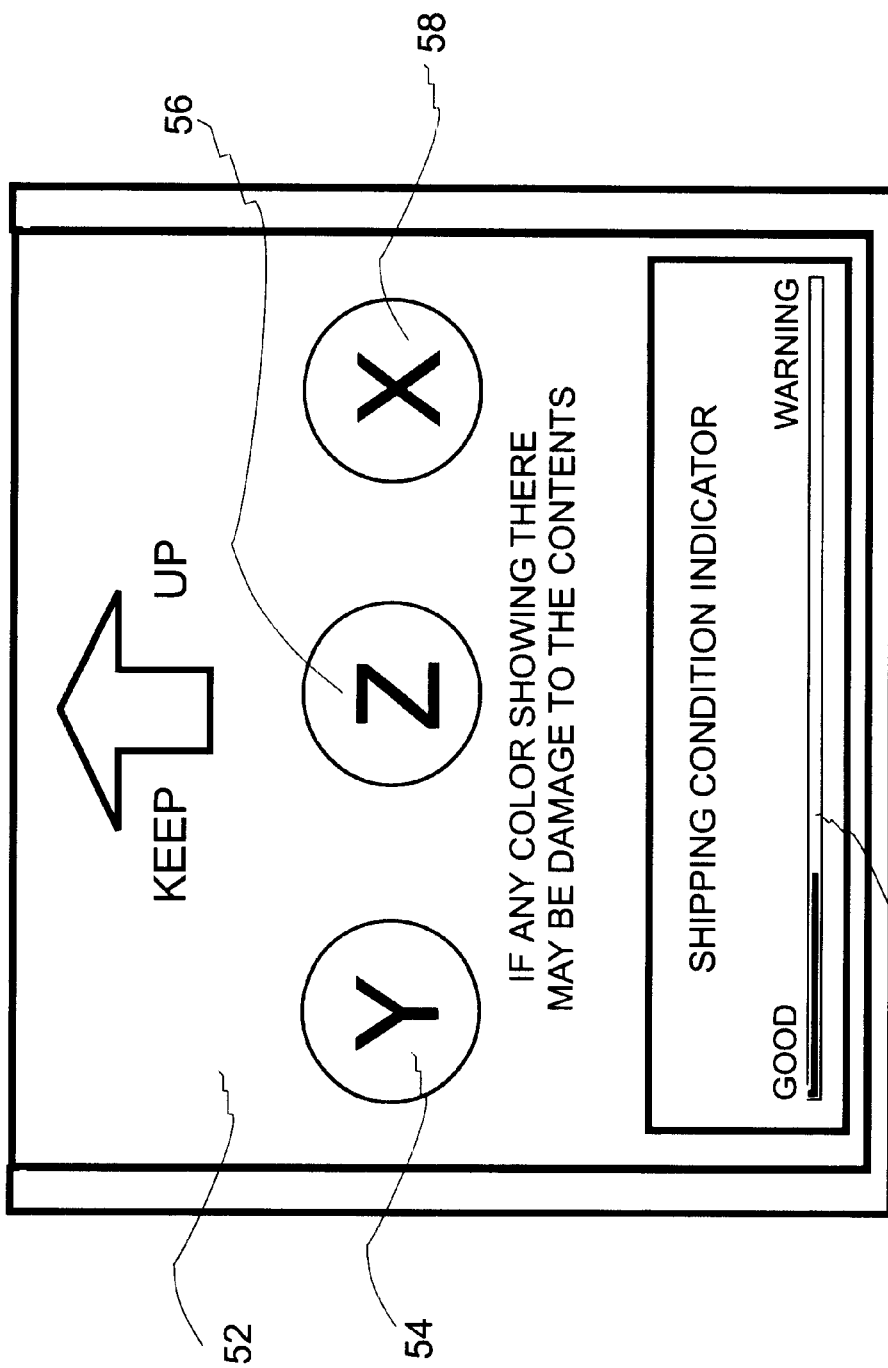

EN ROUTE RAGE SENSING APPARATUS

TECHNICAL FIELD

The present invention relates to a detector that accompanies goods being transported to determine whether the goods have been transported in a recommended position and more particularly to detect whether the goods have been inclined at an angle greater than a predetermined angle or have been subjected to a shock greater than a predetermined magnitude.

BACKGROUND ART

There are many goods, materials, manufactured articles and the like which require that they be transported with care and in a certain position. In the early days, the only way of fulfilling these requirements was to stencil certain instructions onto the packages. These instructions frequently proved to be insufficient since it was common for the contents of the packages to be received at their destination in a damaged condition. Moreover, it is often difficult to determine whether a package has been subjected to excessive shock just by the condition of the package. In any case, there always remained the possibility that the maximum angle of inclination or shock had been violated during shipment but that the goods had been restored to their correct position such that they would later operate incorrectly because of the shipping problems. Specifically, shipping problems arise when a package of such goods was tilted more than the pre-determined maximum angle or subjected to excess shock. For example, computerized telephone switching modules represent such a case in point. The modules cannot be made insensitive to a suspension in any orientation except in the upright position. As these modules are shipped, a tilting angle by only 30°–45° can damage the module with its printed circuitry. Flower arrangements are another example of a package that when shipped cannot be tilted more than the pre-determined maximum angle or be subjected to excess shock.

What is needed, therefore, is a device that indicates on the arrival of the materials at their destination whether or not they have been transported with the recommended care and in the recommended position. The device should be able to indicate if the package during transit had been tilted beyond a maximum pre-determined angle or been subjected to excess shock. There are relatively few devices made and marketed that have been designed to give an indication of both sustained shock and tilting. Such devices have had drawbacks; for example, a lateral impact or acceleration will usually activate the device into its original position, or cause it to indicate a tumbled condition. Although the impact, or acceleration, may or may not be sufficient to cause damage to the contents of a container, these prior art devices would not differentiate between such impact and improper tilting. Other previous tilt devices can be reset with care so that an unsuspecting customer may be duped into receiving a package that has been mishandled.

Accordingly, it is desirable to provide an en route package sensing apparatus that overcomes disadvantages of previous detectors. More particularly, the en route package sensing apparatus should not be able to allow a user to reset the apparatus once it had been activated and a result is shown.

DISCLOSURE OF THE INVENTION

The present invention provides an apparatus and a method for monitoring a package that is being transported. The novel improved apparatus for monitoring a package during its transport is based on attaching a package sensing device to the package that provides an indication whether or not the package has been tilted beyond a pre-determined angle or has been subjected to excess vertical shock. Thus, according to one aspect of the invention, an en route package sensing apparatus for attaching to a package comprises a reservoir having a fluid, a tilt indicator section having an X direction indicator including an X capillary coupled to the fluid in the reservoir, a Y direction indicator including a Y capillary coupled to the fluid in the reservoir, and a Z direction indicator including a Z capillary coupled to the fluid in the reservoir, wherein the fluid from the reservoir flows through one of the X capillary, Y capillary, or Z capillary to a respective corresponding direction indicator in response to tilting the en route package sensing apparatus in a direction corresponding to the particular direction indicator.

According to another aspect of the invention, the X direction indicator, the Y direction indicator, and the Z direction indicator each include fluid absorbent material and the fluid causes the fluid absorbent material to change color indicating contact between the fluid absorbent material and the fluid. Once a direction indicator changes color, it is an indication that the package has been tilted in excess of a pre-determined angle. To aid in discerning whether a particular direction indicator has been activated, the fluid is colored so contact with the fluid absorbent material will be apparent.

According to another aspect of the invention, the reservoir is sealed having s pierceable openings for the X capillary, the Y capillary, and the Z capillary. Once the X capillary, the Y capillary, and the Z capillary pierce the reservoir, the en route package sensing apparatus is activated. Tilting the en route package sensing apparatus beyond a predetermined angle will cause a direction indicator to be discolored. A U-shaped section containing the reservoir is configured to slidable mount to the tilt indicator section and pierce the sealed reservoir with the X capillary, the Y capillary, and the Z capillary to activate the en route package sensing apparatus.

According to yet another aspect of the invention, the en route package sensing apparatus further comprises a shock indicator section having a shock capillary configured to sense vertical shock experienced by the en route package sensing apparatus. More fluid will fill the shock capillary in response to increased vertical shock experienced by the en route package sensing apparatus. Thus, if the package is dropped, the shock capillary fills with fluid. Depending on the severity of the drop, more or less fluid fills the shock capillary.

The above and additional advantages of the present invention will become apparent to those skilled in the art from a reading of the following detailed description when taken in conjunction with the accompanying drawings.

BRIEF DESCRIPTION OF THE DRAWINGS

FIG. 4 illustrates the en route package sensing apparatus tilted in an X direction activating the X indicator.

FIG. 5 illustrates the en route package sensing apparatus tilted in a Y direction activating the Y indicator.

FIG. 6 illustrates the en route package sensing apparatus tilted in a Z direction activating the Z indicators.

FIG. 7 illustrates the en route package sensing apparatus indicating a shock reading.

FIG. 8 illustrates a label affixed to the front side of the en route package sensing apparatus.

BEST MODE FOR CARRYING OUT THE INVENTION

Figure 1:
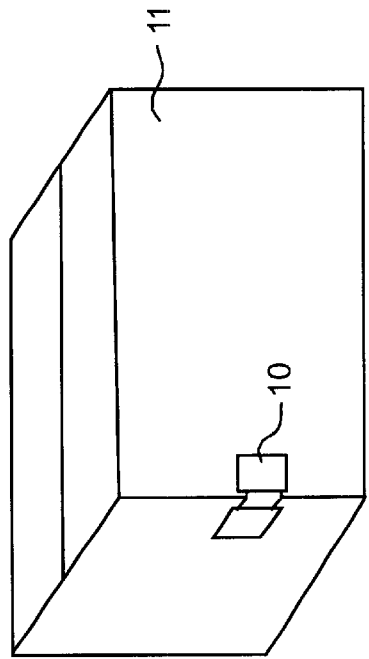
FIG. 1 illustrates an isometric view of one form of the combination of this invention.

Referring to FIG. 1, a shipping package 11 has a pair of an en route package sensing apparatuses 13 affixed on the exterior walls thereof for monitoring whether or not the package has been maintained in their recommended position (not tilted beyond a predetermined maximum angle) and not been subjected to excessive shock during shipment that might result in damage. The shipping package 11 may be any of the conventional forms; such as, crates, pallets and superstructures, corrugated pasteboard containers and even plastic and metal containers that are emplaced about goods to be shipped. The en route package sensing apparatuses 13 are preferably placed on upright walls of the shipping package in their upright position and such that they form an angle of about 90° with respect to each other. With this preferred combination, the en route package sensing apparatuses 13 record movements of the shipping package 11 in all three axes. Accordingly, this affords a positive indication to the recipient if a tilt beyond the maximum allowable angle has been experienced. The recipient has merely to look at the two en route package sensing apparatuses 13 to ascertain if his package is acceptable to sign off for the delivery.

Figure 2B:
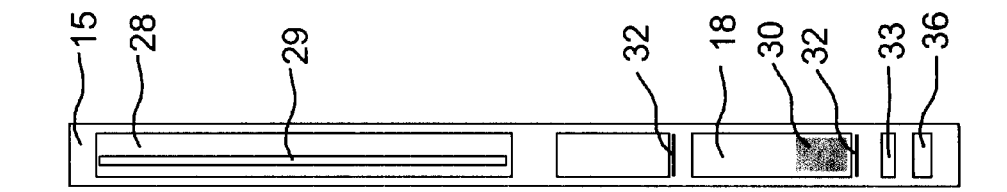
FIG. 2B illustrates a cross-sectional view taken along dotted lines A—A of FIG. 2A.
Figure 2A:
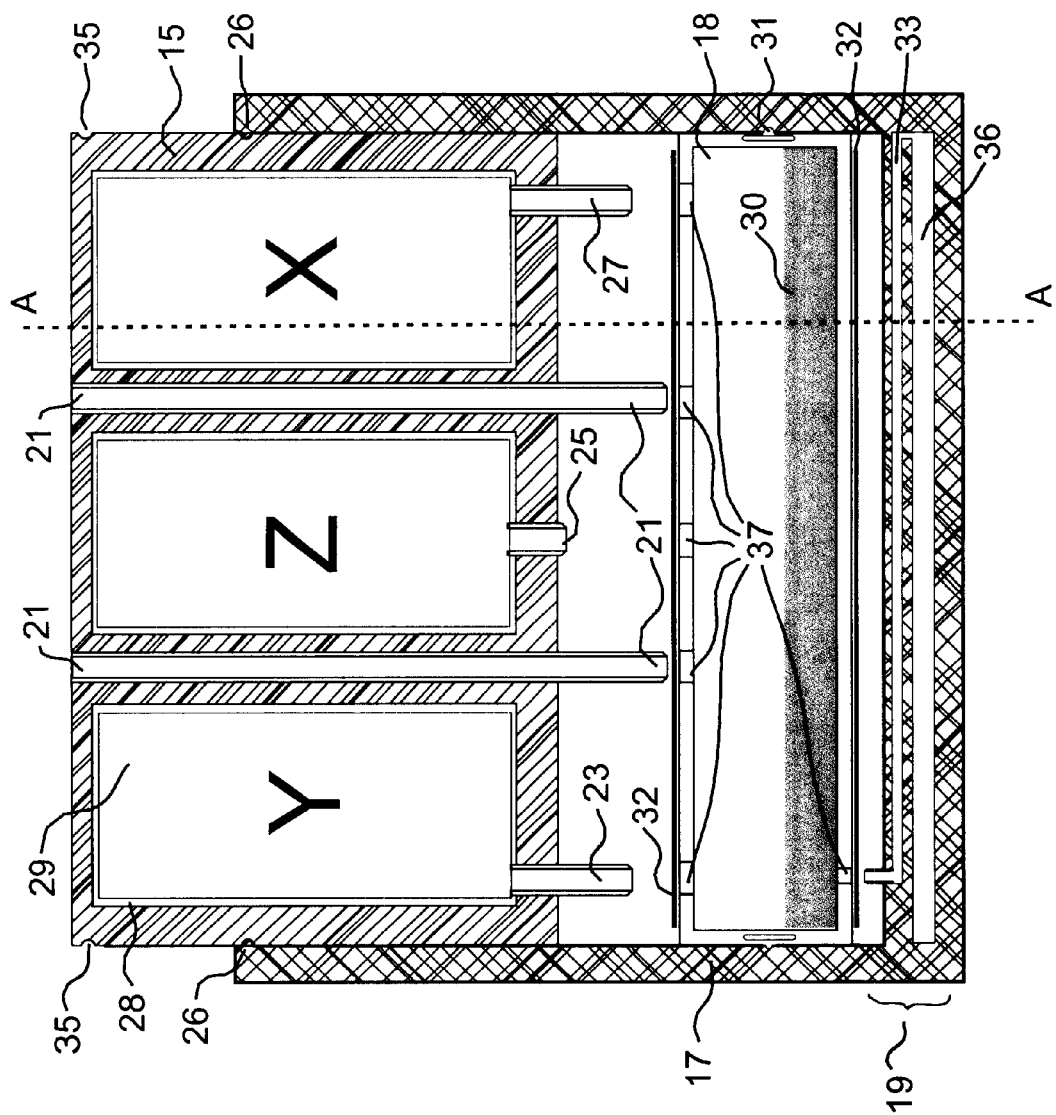
FIG. 2A illustrates a front elevation view of an en route package sensing apparatus according to the present invention.

FIG. 2A illustrates a front view of an en route package sensing apparatus 13 according to the present invention. The en route package sensing apparatus 13 is shown prior to activation. Once the en route package sensing apparatus 13 is activated, it cannot be reset. Thus, it is important that the sensing apparatus 13 is not active until it is readied for use. The en route package sensing apparatus 13 includes a tilt indicator section 15 and a U-shaped section 17. The U-shaped section 17 includes a reservoir 18 and a shock indicator section 19. The tilt indicator section 15 includes air tubes 21, Y capillary 23, Z capillary 25, X capillary 27, indicator enclosures 28, and liquid absorbent materials 29. The reservoir 18 includes fluid 30 sealed within the reservoir 18. Mini detents 31 prevent the reservoir 18 from sliding back and forth during transport of the en route package sensing apparatus 13 prior to activation. The shock indicator section 19 includes a shock capillary 33 that widens and becomes a shock channel 36. Openings 37 are formed in the reservoir 18 to accommodate the air tubes 21, Y capillary 23, Z capillary 25, X capillary 27, and the shock capillary 33. Sealing tape 32 seals the openings 37. The sealing tape 32 may be made of foil, plastic and other functionally similar material. FIG. 2B illustrates a cross section view along section A—A of the en route package sensing apparatus 13.

The fluid 30 is preferably colored, comprises a liquid, and is inert with respect to the reservoir 18. The general requirements for the liquid are:

1. a melting point of about −40° F. (−40 degree. C.);
2. a boiling point of about 212° F. (100 degree. C.); and
3. a flash point of about 100° F. (37.8 degree. C.).

The liquid should have a low toxicity and be relatively nonflammable or have the flash point of at least 100° F. as indicated. Typical of the range of liquids are aqueous solutions containing suitable antifreeze to fluorinated hydrocarbon liquid such as Flourinert. Typical antifreezes that would be added to aqueous solutions to prevent their freezing would be ethylene glycol, diethylene glycol, triethylene glycol, and propylene glycol. Since there are relatively small quantities of the liquid that are employed in the en route package sensing apparatus 13, it may be possible to employ liquids such as ethanol, propanol, and even hydrophobic material such as the light oils, glycerine, or silicone oils. Preferably the liquid is colorable so that it can be made more visible and shows more readily when absorbed by the liquid absorbent material 29.

Figure 3:
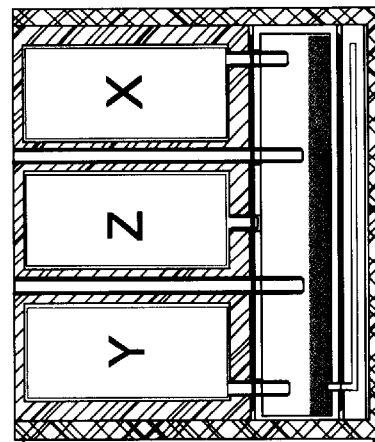
FIG. 3 illustrates an activated en route package sensing apparatus.

FIG. 3 illustrates an activated en route package sensing apparatus 13. Prior to activation, the en route package sensing apparatus 13 is preferably attached to the package 11. The backside of the tilt indicator section 15 (not shown) includes a peel off strip with an adhesive for attaching the en route package sensing apparatus 13 to the package 11. To activate the en route package sensing apparatus 13, the U-shaped section 17 including the reservoir 18 and the shock indicator section 19 is pressed against the tilt indicator section 15 such that the air tubes 21, Y capillary 23, Z capillary 25, X capillary 27, and the shock capillary 33 impales the reservoir 18 at their respective openings 37. The activation force disengages the mini detents 31 enabling the reservoir 18 to self center and be pierced by the air tubes 21, the Y capillary 23, the Z capillary 25, the X capillary 27, and the shock capillary 33. Detents 35 lock the U-shaped section 17 with the tilt indicator section 15 and prevent the en route package sensing apparatus 13 from being deactivated once the capillaries and air tubes have been inserted into the reservoir 18.

In the present invention, the air tubes 21, the Y capillary 23, the Z capillary 25, the X capillary 27, and the shock capillary 33 are made of Lexan plastic (polycarbonate). Other suitable materials include steel and similar materials having rigid properties. The openings 37 afford the air tubes 21, Y capillary 23, Z capillary 25, X capillary 27, and the shock capillary 33 to self-center and impale the reservoir 13 as the U-shaped section 17 mates with the tilt indicator section 15.

FIG. 4 illustrates the en route package sensing apparatus 13 tilted in the X direction causing the fluid 30 to flow through the X capillary 27 and be absorbed by the liquid absorbent material 29. As the liquid absorbent material 29 changes color, it is shown in X indicator 42. Once the liquid absorbent material 29 for the X indicator 42 changes color, it cannot be reversed or reset. It should be noted that an area denoted by dashed lines 43 provides a reserve for the colored fluid 30 so that not all of the fluid will flow through the X capillary 27 to the X indicator 42.

FIG. 5 illustrates the en route package sensing apparatus 13 tilted in the Y direction causing the fluid 30 to flow through the Y capillary 23 and be absorbed by the liquid absorbent material 29. As the liquid absorbent material 29 changes color, it is shown in Y indicator 44. Once the liquid absorbent material 29 for the Y indicator 44 changes color, it cannot be reversed or reset. It should be noted that an area denoted by dashed lines 45 provides a reserve for the fluid 30 so that not all of the fluid will flow through the Y capillary 23 to the Y indicator 44.

FIG. 6 illustrates the en route package sensing apparatus 13 tilted 180° causing the colored fluid 30 to flow through the Z capillary 25 and be absorbed by the liquid absorbent material 29. As the liquid absorbent material 29 changes color, it is shown in Z indicator 50. Once the liquid absorbent material 29 for the Z indicator 50 changes color, it cannot be reversed or reset. It is noted that even if either the X indicator 42 or the Y indicator 44 has changed color, there is still sufficient fluid 30 reserved from the area 43 or the area 45 to flow through the Z capillary 25 to change the color of the Z indicator 50.

FIG. 7 illustrates the en route package sensing apparatus 13 after being subjected to vertical shock. The vertical shock arises from dropping the package 11 with the en route package apparatus 13 attached. The shock capillary 33 partially fills with the fluid 30 when vertically shocked. Because the shock capillary 33 is open to receive the fluid 30 in one end and sealed on the other end, depending on the magnitude of the shock, the amount of fluid 30 that fills the shock capillary 33 is proportional to the magnitude of the shock. Changing the diameter and length of the shock capillary 33 affects the sensitivity of the shock capillary 33. The expanded shock channel 36 increases the sensitivity of the shock capillary 33.

FIG. 8 illustrates a label 52 affixed to the front side of the en route package sensing apparatus 13 according to the present invention. The label 52 includes textual warning and arrow to keep the package pointed up. Y indicator 54, Z indicator 56, and X indicator 58 discolor to alert the receiver of the package that it has been tilted. Shock warning gauge 60 also alerts the receiver of the package the amount of shock that the package has experienced.

Figure 9:
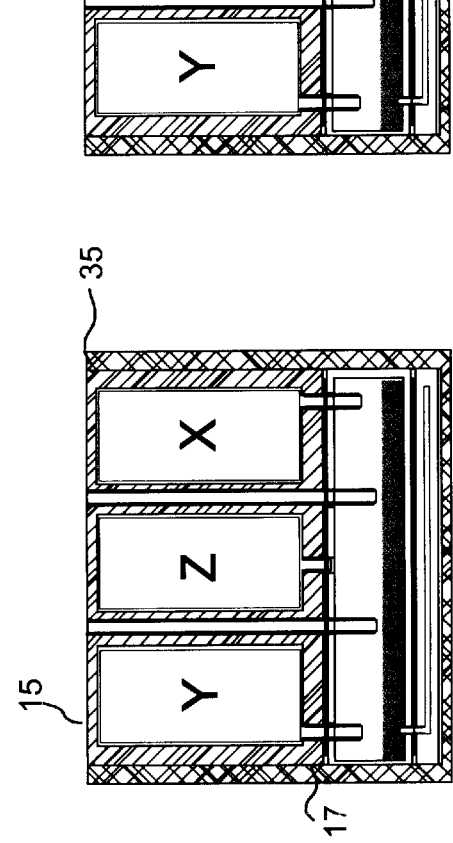
FIG. 9 illustrates a dual en route package sensing apparatus according to an alternative embodiment of the present invention.

FIG. 9 illustrates an alternative embodiment of a dual en route package sensing apparatus 65. The dual en route package sensing apparatus 65 includes two en route package sensing apparatuses 13 pre-attached by a flexible strip 67. The flexible strip 67 affords the dual en route package sensing apparatus 65 to be attached to a package with a single application. The backside of the dual en route package sensing apparatus 65 (not shown) includes a peal off strip with adhesive for attachment to a package.

Figure 10:
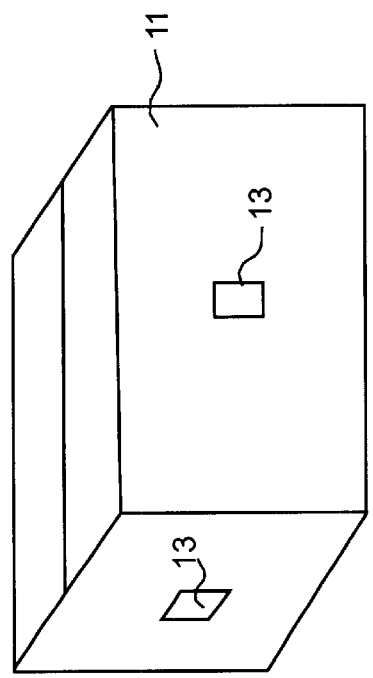
FIG. 10 illustrates an application of the dual en route package sensing apparatus.

FIG. 10 illustrates an application of the dual en route package sensing apparatus 65 attached to the package 11. The dual en route package sensing apparatus 65 can be flexed at the flexible strip 67 to provide two en route package sensing apparatuses 13 for use in other suitable applications. In another variation of the present invention, packages 11 are pre-affixed with the en route package sensing apparatus 13 before they are formed into boxes. Once the boxes are formed and packed with the items to be shipped, the pre-affixed en route package sensing apparatuses 13 are activated to monitor the handling of the package.

While the invention has been described in conjunction with particular best mode embodiments, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and nonlimiting sense.

The invention claimed is:

1. An en route package sensing apparatus for attaching to a package comprising:
   a reservoir having a fluid;
   a tilt indicator section having an X direction indicator including an X capillary, a Y direction indicator including a Y capillary, and a Z direction indicator including a Z capillary;
   wherein the apparatus is positionable into an active state wherein the capillaries each extend into the reservoir such that the fluid from the reservoir flows through one of the X capillary, Y capillary, or Z capillary to a respective corresponding direction indicator in response to tilting the en route package sensing apparatus in a direction corresponding to the particular direction indicator.

2. The apparatus as claimed in claim 1, wherein the X direction indicator, the Y direction indicator, and the Z direction indicator each include fluid absorbent material and the fluid causes the fluid absorbent material to change color indicating contact between the fluid absorbent material and the fluid.

3. The apparatus as claimed in claim 2, wherein the fluid is a colored fluid.

4. The apparatus as claimed in claim 2, wherein the apparatus is positionable into an inactive state wherein the reservoir is sealed and has pierceable openings for the X capillary, the Y capillary, and the Z capillary.

5. The apparatus as claimed in claim 4, wherein the reservoir includes a U-shaped section configured to slidable mount to the tilt indicator section for piercing the sealed reservoir with the X capillary, the Y capillary, and the Z capillary to activate the en route package sensing apparatus.

6. The apparatus as claimed in claim 1 further comprising a shock indicator section having a shock capillary coupled to the fluid in the reservoir when the apparatus is in the active state, said shock indicator section configured to sense vertical shock experienced by the en route package sensing apparatus.

7. The apparatus as claimed in claim 6, wherein more fluid fills the shock capillary in response to increased vertical shock experienced by the en route package sensing apparatus when the apparatus is in the active state.

8. An en route sensing apparatus comprising:
   a tilt indicator section having an X direction indicator including an X capillary, a Y direction indicator including an Y capillary, and a Z direction indicator including a Z capillary; and
   a U-shaped housing configured to slidable mate with the tilt indicator section having:
     a reservoir section including a container for indicator fluid; and
     a shock indicator section including a shock capillary;
   wherein the apparatus is positionable into an active state wherein the capillaries each extend into the reservoir such that the tilt indicator section receives the indicator fluid via one of the X, Y, and Z capillaries to a direction indicator in response to tilting the en route sensing apparatus in a respective direction, and the shock capillary is coupled to the reservoir for receiving fluid when the apparatus is subjected to a shock.

9. The en route sensing apparatus as claimed in claim 8, wherein the direction indicator includes absorbent material that absorbs the indicator fluid when the direction indicator receives the indicator fluid.

10. The en route sensing apparatus as claimed in claim 8, wherein the tilt indicator section includes adhesive for attaching the en route sensing apparatus to a package.

11. The en route sensing apparatus as claimed in claim 8, wherein a vertical shock causes the indicator fluid to flow into the shock capillary.

12. The en route sensing apparatus as claimed in claim 11, wherein increased vertical shock magnitude causes increased amount of the indicator fluid to flow into the shock capillary.

13. The en route sensing apparatus as claimed in claim 8, the apparatus including an inactive state wherein:
- the container is seal;
- the U-shaped housing slidable mates with the tilt indicator section; and
- the X capillary of the X direction indicator, the Y capillary of the Y direction indicator, and the Z capillary of the Z direction indicator are positioned to pierce the sealed container to activate the en route sensing apparatus.

14. The en route sensing apparatus as claimed in claim 13, wherein the shock capillary of the shock indicator pierces the sealed container as the U-shaped housing slides relative to the tilt indicator section.

15. The en route sensing apparatus as claimed in claim 13, wherein the reservoir section movably slides within the U-shaped section.

16. The en route sensing apparatus as claimed in claim 13, wherein:
- the sealed container includes openings for the X capillary, the Y capillary, the Z capillary, and the shock capillary; and
- a pierceable foil seals over the openings.

17. A method of operating an en route package sensing apparatus having a tilt indicator section including an X direction indicator and an X capillary, a Y direction indicator and a Y capillary, and a Z direction indicator and a Z capillary said apparatus also having a U-shaped section including a sealed reservoir, said method comprising the steps:
- attaching the en route package sensing apparatus to a package to be transported;
- sliding the U-shaped section relative to the tilt indicator section wherein the X capillary, the Y capillary, and the Z capillary pierce the sealed reservoir to activate the en route package sensing apparatus.

18. The method of operating an en route package sensing apparatus as claimed in claim 17, wherein the U-shaped section includes a shock indicator section having a shock capillary and the step of sliding includes piercing the sealed reservoir with the shock capillary.

19. The method of operating an en route package sensing apparatus as claimed in claim 17 further comprising the step of transferring fluid from the reservoir to one of said indicators via a respective one of said capillaries in response to tilting the package in a particular direction corresponding to said one indicator.

* * * * *